United States Patent
Emerick et al.

(10) Patent No.: US 10,867,118 B2
(45) Date of Patent: Dec. 15, 2020

(54) METHOD AND SYSTEM FOR IMPLEMENTING A COLLABORATION PLATFORM FOR STRUCTURED OBJECTS IN A DOCUMENT

(71) Applicant: Box, Inc., Redwood City, CA (US)

(72) Inventors: Brian J. Emerick, Mountain View, CA (US); Sahil Amoli, San Francisco, CA (US); Florian Jourda, San Francisco, CA (US); Ke Huang, Mountain View, CA (US); Yingming Chen, Mountain View, CA (US); Naeim Semsarilar, San Carlos, CA (US)

(73) Assignee: Box, Inc., Redwood City, CA (US)

( * ) Notice: Subject to any disclaimer, the term of this patent is extended or adjusted under 35 U.S.C. 154(b) by 57 days.

(21) Appl. No.: 15/008,360

(22) Filed: Jan. 27, 2016

(65) Prior Publication Data

US 2017/0024365 A1     Jan. 26, 2017

Related U.S. Application Data

(60) Provisional application No. 62/109,019, filed on Jan. 28, 2015.

(51) Int. Cl.
*G06F 40/14* (2020.01)
*G06F 40/177* (2020.01)
*G06F 16/93* (2019.01)
*G06F 16/958* (2019.01)

(52) U.S. Cl.
CPC .............. *G06F 40/14* (2020.01); *G06F 16/93* (2019.01); *G06F 16/986* (2019.01); *G06F 40/177* (2020.01)

(58) Field of Classification Search
CPC .... G06F 17/24; G06F 17/245; G06F 17/2247; G06F 21/554; G06F 3/0482
See application file for complete search history.

(56) References Cited

U.S. PATENT DOCUMENTS

| | | | | |
|---|---|---|---|---|
| 6,046,740 A | * | 4/2000 | LaRoche | G06K 9/00476 715/764 |
| 7,069,507 B1 | * | 6/2006 | Alcazar | G06F 9/542 715/202 |
| 8,108,779 B1 | * | 1/2012 | Rein | G06F 17/30017 715/733 |

(Continued)

FOREIGN PATENT DOCUMENTS

WO   WO 2012099617 A1   7/2012
WO   WO 2012177242 A1   12/2012

(Continued)

OTHER PUBLICATIONS

The Free Dictionary, "cell address," copyright 2003, thefreedictionary.com, https://encyclopedia2.thefreedictionary.com/cell+address , p. 1 (Year: 2003).*

*Primary Examiner* — Ariel Mercado
(74) *Attorney, Agent, or Firm* — Vista IP Law Group, LLP

(57) ABSTRACT

Disclosed is an approach for implementing an editing tool that can effectively leverage the "contentEditable" feature, while reliably being able to work with structured objects within a document. The approach is particularly useful to implement tools that allow for collaboration with respect to the structured objects.

27 Claims, 17 Drawing Sheets

(56) References Cited

U.S. PATENT DOCUMENTS

| | | |
|---|---|---|
| 8,140,513 B2 | 3/2012 | Ghods |
| 9,015,601 B2 | 4/2015 | Trombley-Shapiro et al. |
| 9,063,912 B2 | 6/2015 | Seibert, Jr. et al. |
| 2003/0023632 A1* | 1/2003 | Ries ............... G06F 40/166 715/235 |
| 2003/0229607 A1* | 12/2003 | Zellweger ........ G06F 40/183 |
| 2004/0216038 A1* | 10/2004 | Liu ................. G06F 16/958 715/227 |
| 2004/0261023 A1* | 12/2004 | Bier ................. G06F 15/00 715/530 |
| 2004/0268235 A1* | 12/2004 | Wason .............. G06F 17/24 715/205 |
| 2009/0019353 A1* | 1/2009 | Abrams ............ G06F 40/14 715/224 |
| 2009/0217158 A1* | 8/2009 | Bailey ............. G06F 40/166 715/255 |
| 2009/0259949 A1* | 10/2009 | Verlaan ........... G06F 40/166 715/760 |
| 2011/0252304 A1* | 10/2011 | Lemonik ........... G06F 40/14 715/234 |
| 2011/0258538 A1* | 10/2011 | Liu ................. G06F 17/2211 715/256 |
| 2011/0283148 A1* | 11/2011 | Rossi .............. G06F 11/3684 714/38.1 |
| 2014/0012814 A1 | 1/2014 | Bercovici et al. |
| 2014/0201145 A1 | 7/2014 | Dorman et al. |
| 2014/0258972 A1 | 9/2014 | Savage et al. |
| 2014/0337291 A1 | 11/2014 | Dorman et al. |
| 2014/0379647 A1 | 12/2014 | Smith et al. |
| 2015/0081773 A1 | 3/2015 | Ansel et al. |
| 2015/0339113 A1 | 11/2015 | Dorman et al. |
| 2016/0154771 A1* | 6/2016 | Tang ............... G06F 3/0481 715/234 |
| 2017/0017779 A1 | 1/2017 | Huang et al. |
| 2017/0024365 A1 | 1/2017 | Emerick et al. |
| 2017/0147545 A1 | 5/2017 | Amoli et al. |

FOREIGN PATENT DOCUMENTS

| | | |
|---|---|---|
| WO | WO 2012177254 A1 | 12/2012 |
| WO | WO 2013062599 A1 | 5/2013 |

* cited by examiner

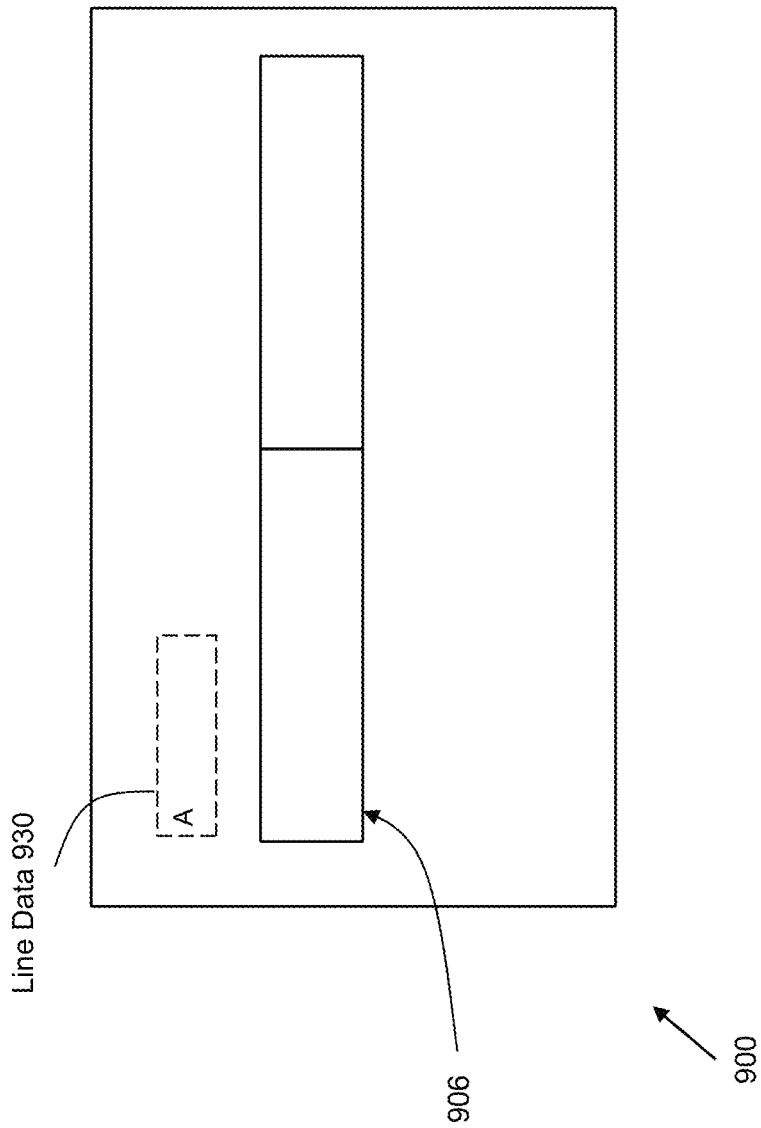

METHOD AND SYSTEM FOR IMPLEMENTING A COLLABORATION PLATFORM FOR STRUCTURED OBJECTS IN A DOCUMENT

CROSS-REFERENCE TO RELATED APPLICATIONS

The present application claims the benefit of priority to U.S. Provisional Application No. 62/109,019, filed on Jan. 28, 2015, which is hereby incorporated by reference in its entirety.

BACKGROUND

With the advancement in digital and online technologies, people now manage an abundance of information and are in constant communication with others regardless of time and location. Cloud-based collaboration platforms have been developed to support such lifestyles. It can be useful for such platforms to offer features that enable users to create, view, edit, annotate, store, share and otherwise manage information in a user friendly and efficient manner.

An editing tool may be provided in a collaborative environment to permit multiple users to edit the same document. For example, a browser-based editing tool may be provided to allow multiple users to collaboratively edit a document. There are many ways that can be taken to implement such editing tools that are operable from within a web browser.

One possible approach is to implement a tool that heavily relies upon built-in browser capabilities to implement document editing functionality. For example, some tools are built upon the "contentEditable" feature, which is a capability of modern browsers that allows any element to be transformed into a rich text editor. This feature began as a creation of Internet Explorer and was later reverse-engineered by other browsers. An example of a known tool that uses this approach is the open source Etherpad product. However, one problem with this approach to implement an editing tool is that the "contentEditable" feature may differ between different browsers, and as such, the number and variety of cross-browser compatibility issues may create problems for web developers. In addition, conventional tools that rely upon this feature do not have the capability to reliably and scalably implement and edit structured objects in documents, such as tables and lists.

Another possible approach is to implement a tool that does not rely upon built-in browser editing capabilities (such as the "contentEditable" feature), but instead uses a self-contained and robust implementation of an editing tool that is configured to run within a browser. An example of a known tool that uses this approach is the Google Docs product. The inefficiency with this approach is that it fails to leverage existing useful capabilities of the browsers, and therefore can typically only be implemented based upon a massive effort to create an entire editing tool stack from the ground-up.

Therefore, there is a need for an improved approach to implement a web-based editing tool, particularly for collaborative editing environments.

SUMMARY

Embodiments of the present invention provide an approach for implementing an editing tool, e.g., a web-based editing tool and/or browser-based editing tool, that can effectively leverage built-in functionality (such as the "contentEditable" feature), while reliably being able to work with structured objects within a document. The embodiments of the invention provide a method and mechanism that can also allow multiple users to collaborate on those structured objects in the document.

Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIGS. 9A-9H provides an illustration of some embodiments of the invention.

DETAILED DESCRIPTION

Figure 1:
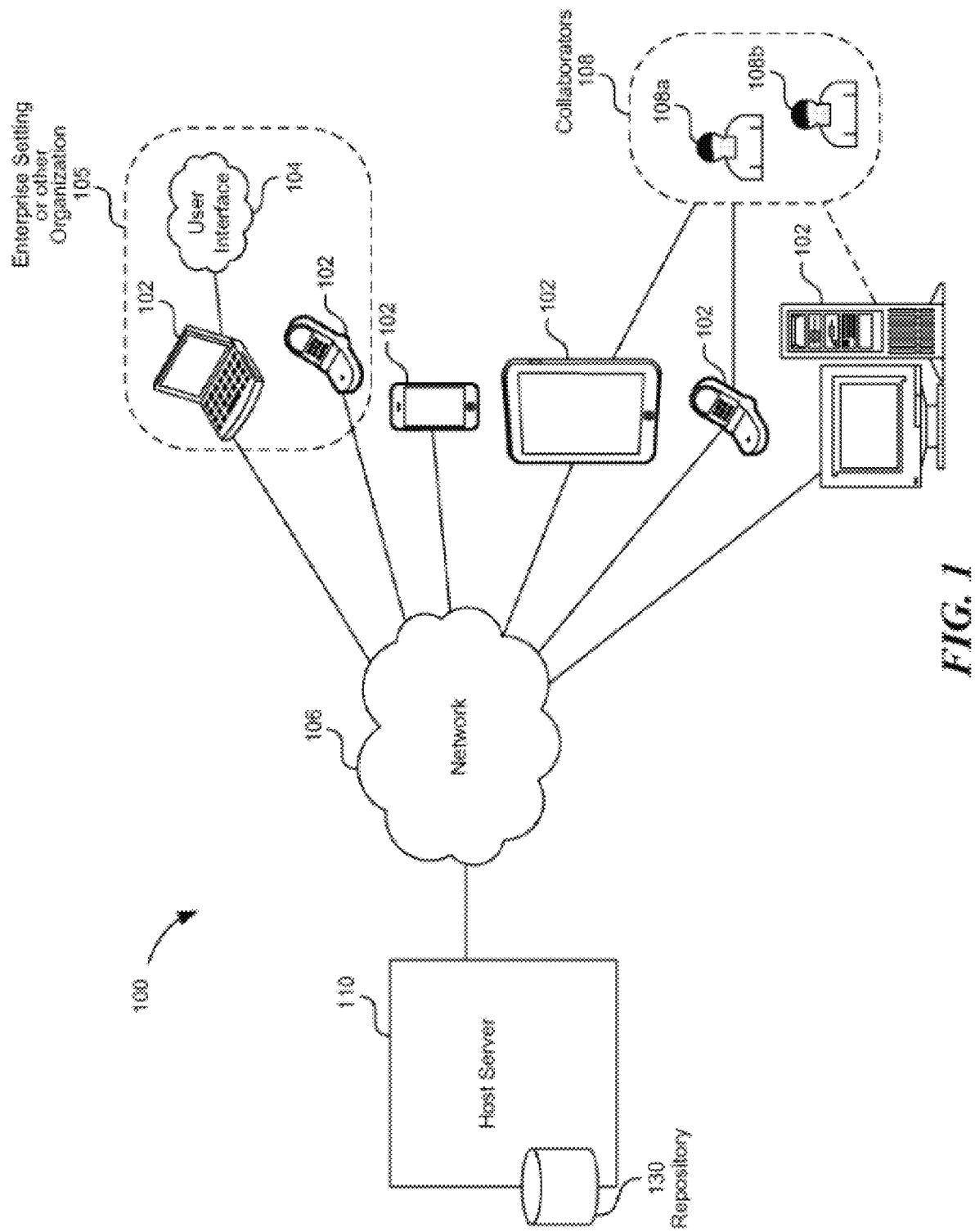
FIG. 1 contains a diagram illustrating an example development and communication environment where users interact with a cloud service, collaboration and/or cloud storage platform.

Embodiments of the present invention provide an approach for implementing a web-based editing tool that can effectively leverage built-in browser functionality (such as the "contentEditable" feature), while reliably being able to work with structured objects within a document. For the purposes of illustration and/or example, the following will provide a description of embodiments of the invention specifically in the context of the contentEditable feature. It is noted however, that the inventive principles may be applicable to other features as well, and is not to be limited only to the contentEditable feature unless explicitly claimed as such.

In some embodiments, the system allows contentEditable to drive most direct content entry and then react to the content soon after entry to roll it into a model layer. For normal text input, standard contentEditable is usually performed. Even some other actions, such as enter and paste, are generally acceptable. The system trusts contentEditable to handle raw content entry in the majority of cases; but also grants it freedom and course-correct afterward if a problem occurs. This offers greater efficiency, since the system does not need to expend processing power for every action.

The system also maintains an internal model representation of the content that avoids browser DOM (document object model) inconsistencies. On a short interval, the system will check for changes near the cursor location, roll differences into the model, and rebuild the DOM at that location to ensure it is sanitized and normalized. For example, a determination can be made whether the user managed to paste content wrapped in a <blink> tag. In some embodiments, the system can be configured to detect and rebuild it without the tag if this occurs.

As previously noted, contentEditable may not be configured to handle certain actions in a conventional way. For example, when adding tables to a document, conventional contentEditable usage produces behavior that contradicts what a user has come to expect, as laid out by other industry standard editors. With regards to tables, a core standard is that a table's structure must be respected and prioritized above content within the table. The only way the structure should change is through a deliberate structure-altering action by a user, such as pressing the "delete row" button. In most browsers, raw contentEditable allows normal selection and input operations to violate a table's structure. Selecting the contents of two cells and dragging into another cell results in those two cells being moved to the ending cell. That cell now contains a mini table structure, and the table is left with a gaping hole. Additionally, selecting over an entire row and pressing delete will destroy that row structure. The expected behavior is that only the contents of the cells in that row are deleted, rather than altering the physical structure. This same issue holds true for any delete operation in this scenario, e.g., select-and-type, backspace, and even cut. To add to the complexity, these issues manifest to different degrees in different browsers. While the above focuses primarily on the Chrome™ browser experience, in the Internet Explorer® browser, selecting over rows and typing does nothing at all, which is just as confusing.

One reason for this issue is because the known tools that use the contentEditable feature (rather than building a self-contained editing tool from the ground up) are configured to only recognize and structurally operate on individual lines of text within the document. If other non-line objects (e.g., table cells) are intended to be included within documents, this causes the editing system to potentially react in ways that are not generally desired for the editing tool.

Figure 3:
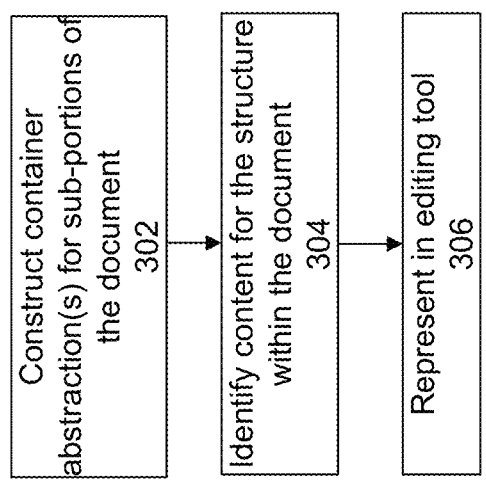
FIG. 3 shows a flowchart of the actions performed by some embodiments of the invention.

FIG. 3 shows a high-level flowchart of an approach to implement an editing tool, e.g., a web-based or browser-based editing tool, that can address this issue. At 302, container abstractions (which may also be referred to herein as "structure nodes") are created for sub-portions of the document. In the known tools that use the contentEditable feature, one of the problems is that the entire document may be treated as a single large "container". This is problematic if different portions of the document need to be viewed differently from other portions. Therefore, some embodiments of the invention will create multiple containers that correspond to individual portions of the document.

The containers may be constructed to any desired level of granularity, and the size of the container may be specifically configured to address the type of document object that is to be inserted and/or edited in the editing tool. For example, when implementing a table object, each container may represent one or more cells within the table.

Any suitable approach may be implemented to construct the container abstractions. One possible approach is to implement metadata to be associated with each line within the document that identifies a container corresponding to the line, e.g., by adding the metadata itself to the line or by placing the metadata within a separate metadata mapping structure. This approach essentially creates the concepts of an "attribute" for lines within the document, where the attribute identifies and corresponds to the structural significance of the line (e.g., as a specific cell within a larger table structure).

At 304, content is identified for the structure within the document. This action identifies the specific lines that are associated with the various parts of the structured object in the document. For example, for a table object, this action would identify the various cells within the table.

At 306, the structural object is then represented in the editing tool. The individual containers can be treated as separate objects to be handled by the tool. The related containers are stitched together to form the entirety of the structured object. Even if the editing feature within the tool is configured to only be able to recognize lines, this permits the lines within each container to be handled by the tool as desired.

Figure 4:
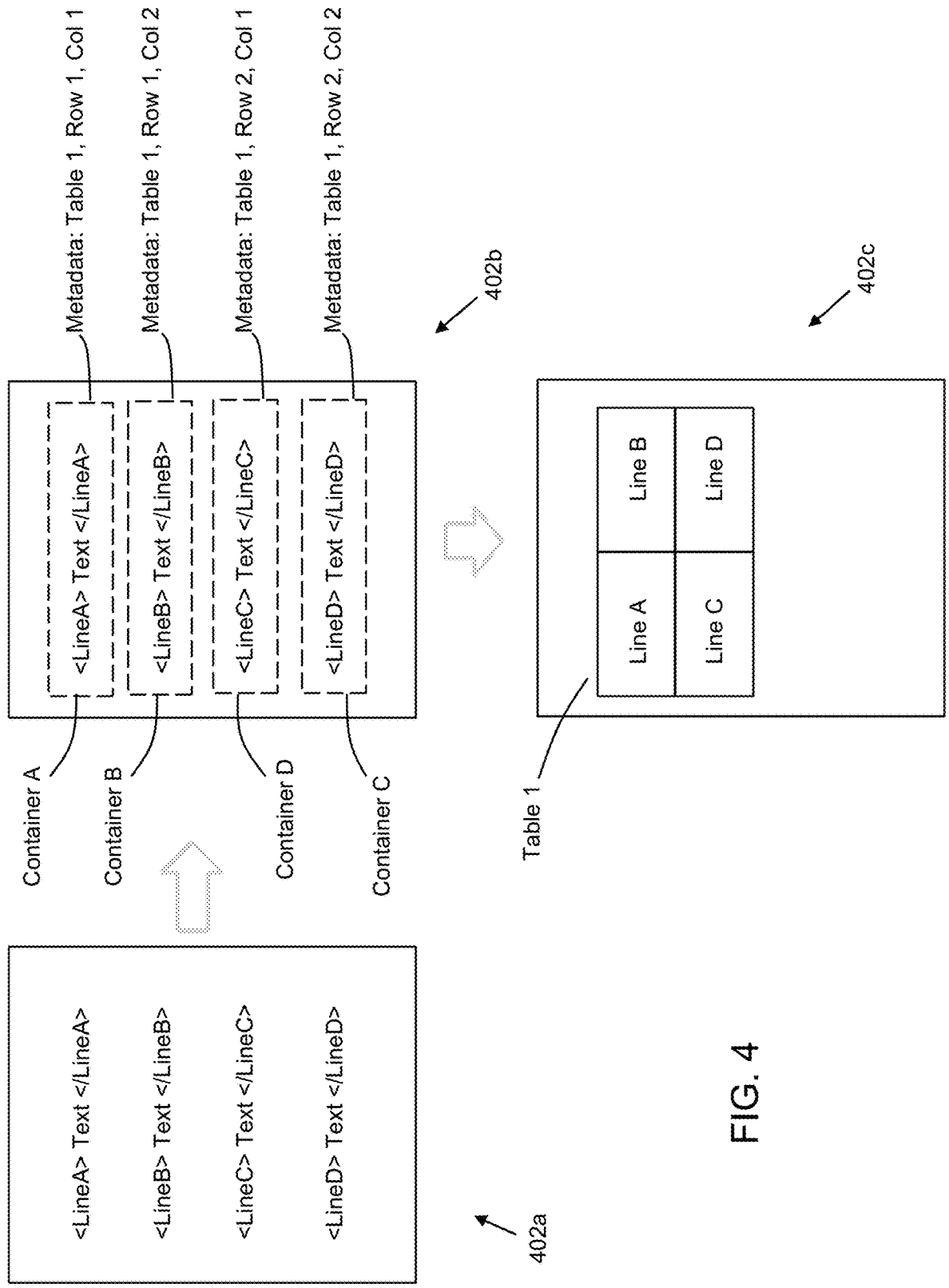
FIG. 4 illustrates some embodiments of the invention.

FIG. 4 provides an illustration of this process. Object 402a represents a document having a set of individual lines, including lines A, B, C, and D. As shown in document 402b, container abstractions have been associated with each of these lines. Each line corresponds to metadata that identifies the structural context for that line within a larger object. In this case, line A corresponds to Row 1, Column 1 for Table 1. Similarly, line B corresponds to Row 1, Column 2 for Table 1, line C corresponds to Row 2, Column 1 for Table 1, and line D corresponds to Row 2, Column 2 for Table 1.

The editing tool can take this representation of the document to visually provide version 402c of the document that now include a representation of table 1. Each identified line of the document corresponds to a cell within the table, and can therefore be appropriately placed within the correct column/row of the document. When editing is performed upon the table, the editing tool can precisely handle the required editing functionality since the lines within the cells can be properly addressed within the container.

The present approach can be used to implement any type of structured object into the document. While the examples used throughout this disclosure pertain to table objects, it is noted that the invention is applicable to other types of objects as well. For example, the inventive concepts disclosed herein are also applicable to list objects as well.

In addition to the above, some embodiments also provide advanced approaches to implement usage of input events and a selection API (application programming interface). On a keydown, one can observe the keystroke, user selection, and selected DOM to understand the user's intent, as well as what behavior contentEditable is most likely to exhibit. During keydown, the user's intent is determinable, but the result of the action has not yet persisted through to the DOM. It is only on the follow-up event, keypress, that contentEditable will alter the DOM. Keydown provides the perfect opportunity for the system to prepare for or prevent the result of the action.

There are various ways that can be taken to determine the user's intent on keydown. Although the system does not have all possible information—for example, the system may not necessarily know the character's case—the system does know the physical key that is pressed and what the DOM looks like under the user's selection. With this knowledge, one can detect a substantial portion of the critical cases and react to them accordingly.

Figure 5:
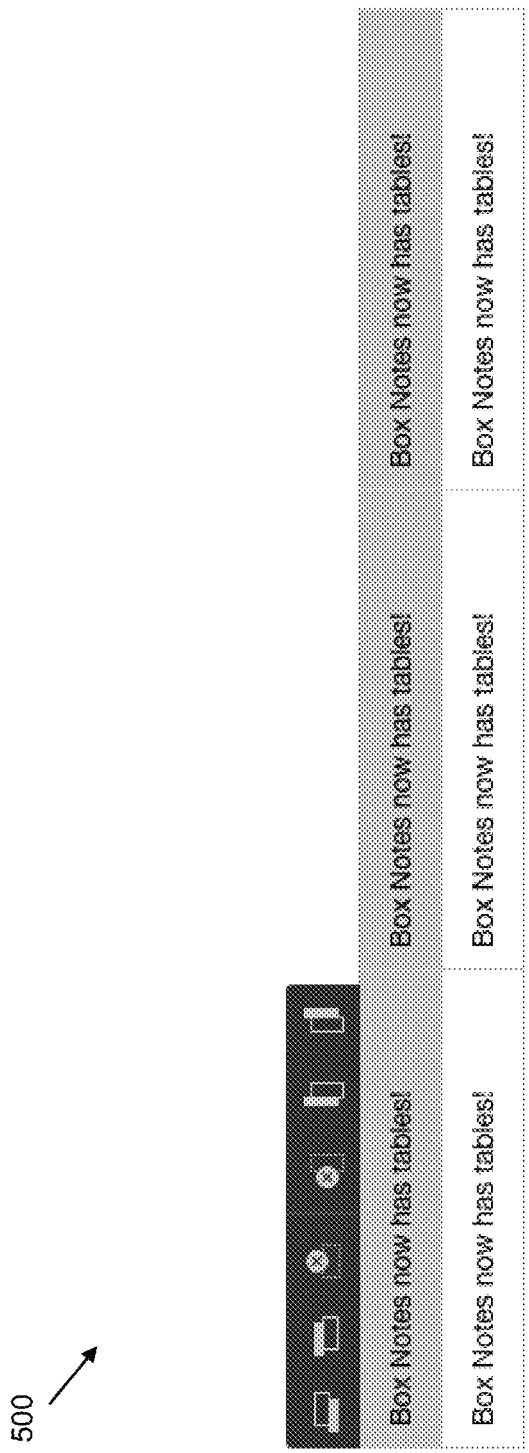
FIG. 5 illustrates an example editing operation on a table object.

For example, consider the scenario mentioned above where a user has a selection that spans an entire row, e.g., as represented in FIG. 5. Here, assume the user then presses the 'A' key. Using the Selection API, one can detect that the user's selection spans over the first row element. Thus, it can inferred that contentEditable is about to destroy the row as part of the operation, which is an action that is not wanted.

One way to prevent this is to implement functionality to prevent default contentEditable functionality in a browser, by removing the selected content from the cells and inserting the character. This can work but comes with its own flaws, since some clients do not approve of this type of heavy-handed action. In particular, iOS autocorrect will become confused by this behavior. By forcibly shutting down the input event and implementing the change in this manner, autocorrect will no longer recognize the input in a normalized fashion and will instead implement its corrections in erroneous ways.

Figure 6:
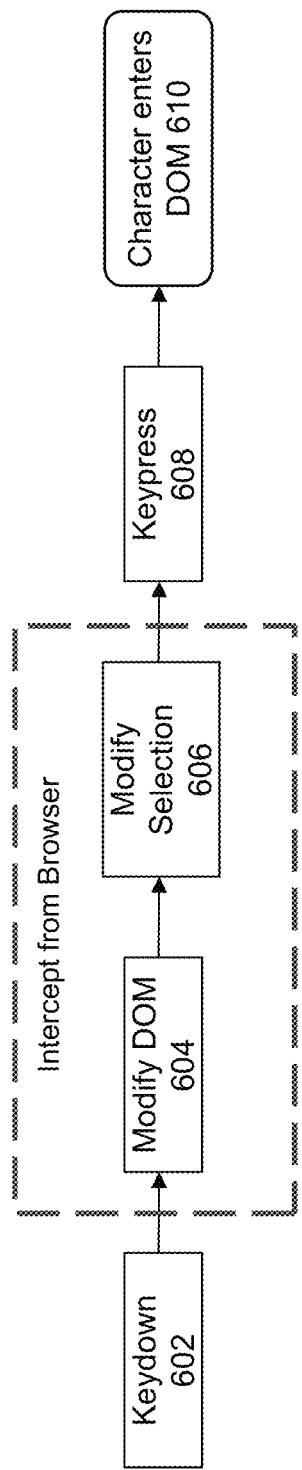
FIG. 6 illustrates an example flow according to some embodiments of the invention.

In an alternate approach illustrated in FIG. 6, the event is allowed to proceed unobstructed. In this way, the system is not disrupting the flow of normal input operations. During keydown, the opportunity is presented to intercept the normal browser actions, by making alterations to the DOM and user selection before the character is actually put in place. In this case, one can remove the content of all cells in the selection and ensure the user's selection ends up collapsed at the very beginning of the top left cell. When keypress fires and actually inserts the character in the DOM, it will end up where the user expects it to, and neither the client environment nor the user will be any the wiser.

The process of FIG. 6 begins when a keydown event is recognized at 602. At this point, a recognition is made whether the action being initiated by the keydown event when handled by default contentEditable functionality in a browser corresponds to expected behavior. If the default action does correspond to the expected behavior, default behavior by the browser will proceed as normal, e.g., where the keydown event 602 will proceed directly to the keypress event at 608, followed by the entry of characters into the DOM at 610.

For example, assume that a user has selected an entire table (and not just a portion of a table), and then pressed any key, e.g., the key for the letter "A". In this situation, the normal behavior is to delete the entire object that was selected (i.e., the table), and perhaps replace it with the character of the key that was pressed (e.g., the "A" letter if that key was pressed). In this situation, the default contentEditable functionality in the browser is to take these actions, and therefore there is no reason to deviate from the default behavior. As such, the default behavior is performed, without incurring the need to consume any resources to take non-default actions to handle those changes external to the normal browser behavior.

However, assume that the user has selected only a portion of the table and then pressed the "A" key. In this situation, the default browser behavior for the contentEditable functionality may be to entirely delete the selected portion of the table, including the structure of the rows/columns of the selected portion of the table—rather than expected behavior of just deleting the content of the rows/columns without changing the table schema.

In this situation, recognition is made that the action initiated by the keydown event would not be correct if allowed to proceed with the default contentEditable functionality in the browser. As such, additional actions are taken to intercept the process flow. At 604, new HTML is created for the DOM that implements the expected behavior. Since the user section for the keypress may have encapsulated multiple "fields" within a table, the user selection may be modified at 606 to reorient the section properly for the next steps of any editing activity. Thereafter, the rest of the actions can proceed with the default contentEditable functionality in the browser for the keypress event 608 and the DOM character entry at 610.

Figure 9A:
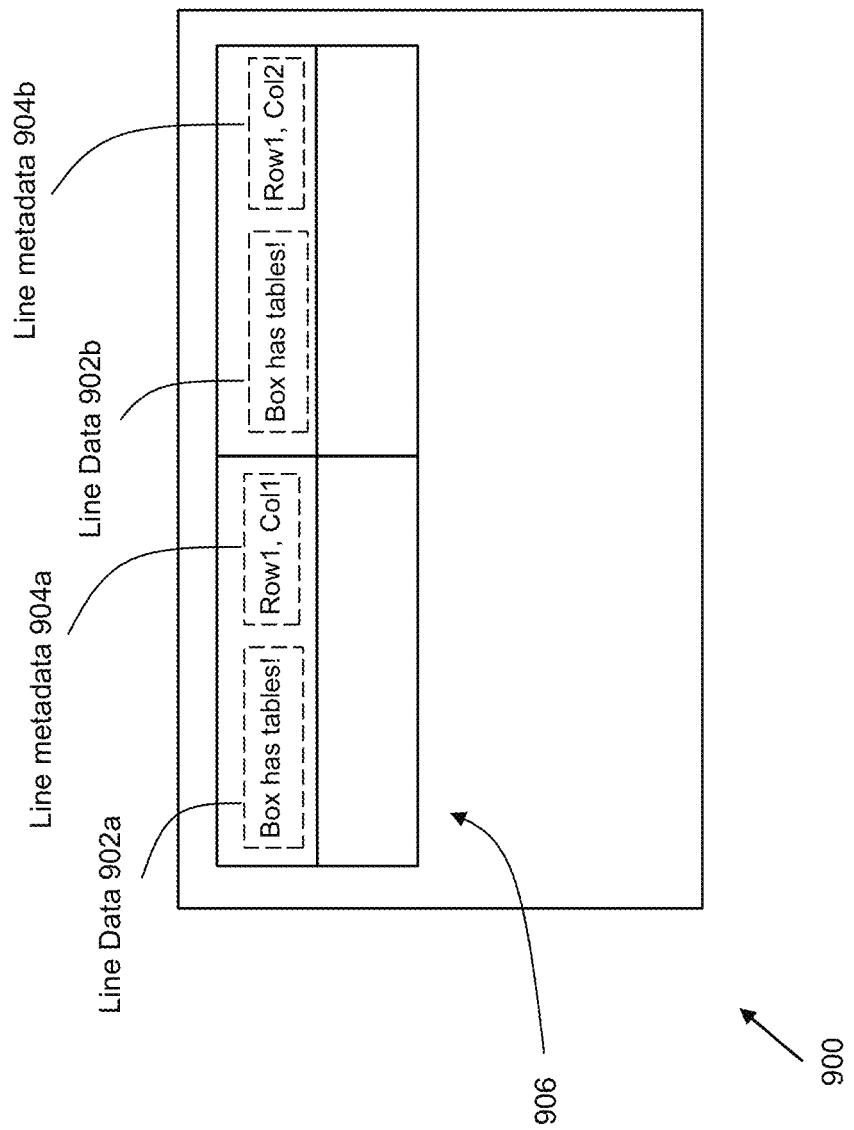

FIGS. 9A-H illustrate this process. FIG. 9A shows a document 900 in a browser that includes a table 906. Table 906 currently has two rows, with each row having two columns. The first row corresponds to a first column having line data 902a and line metadata 904a. The line data 902a includes the actual line content of that column while the line metadata comprises information about the structure for that line (e.g., having metadata that identifies the structure for this line as being column 1 of row 1 of table 906). The line itself therefore corresponds to a "line node" and the structure of the line within the table corresponds to a "structure node". In a similar manner, the second column for the first row corresponds to line data 902b and line metadata 904b.

Figure 9B:
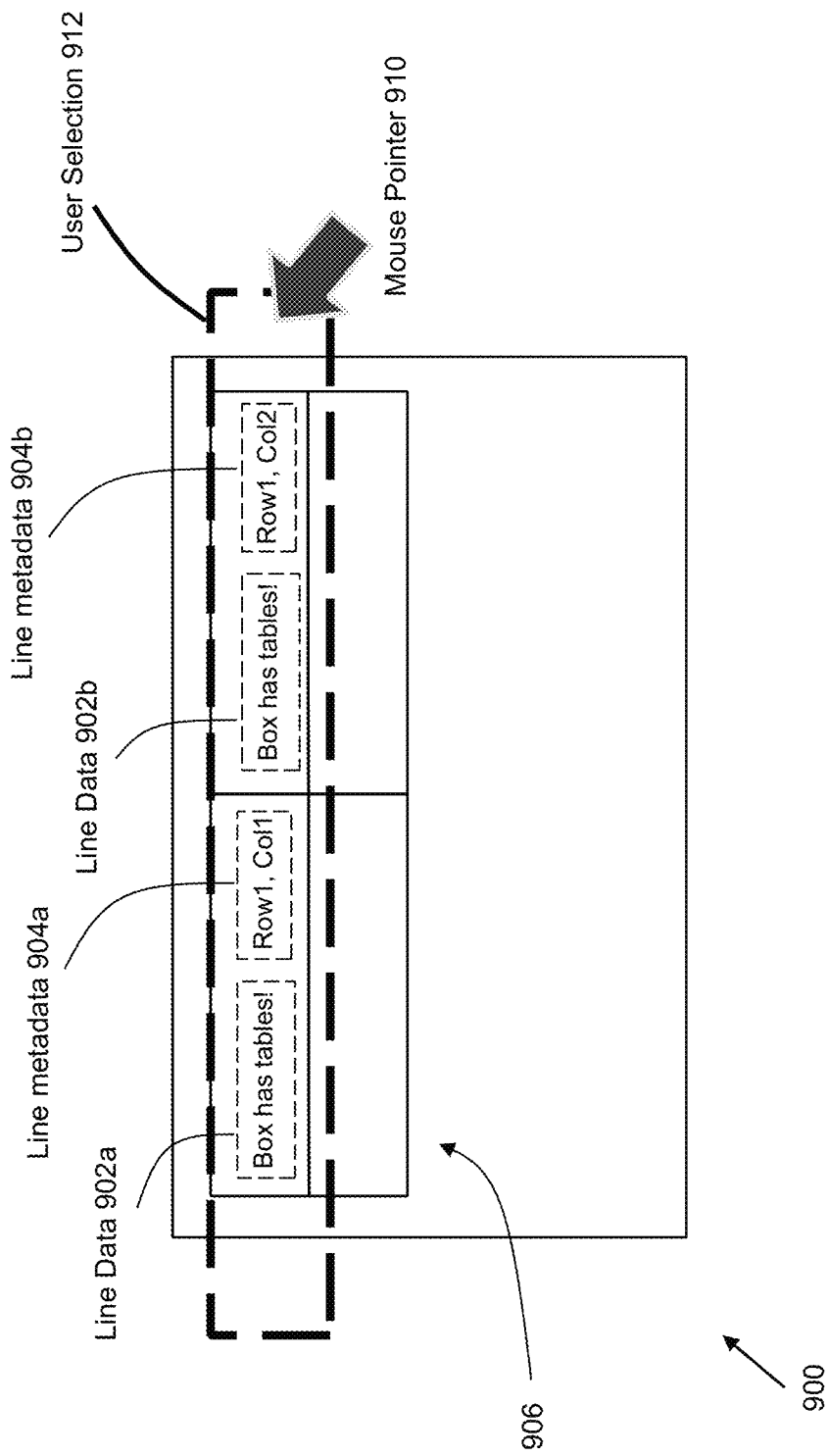
Figure 9C:
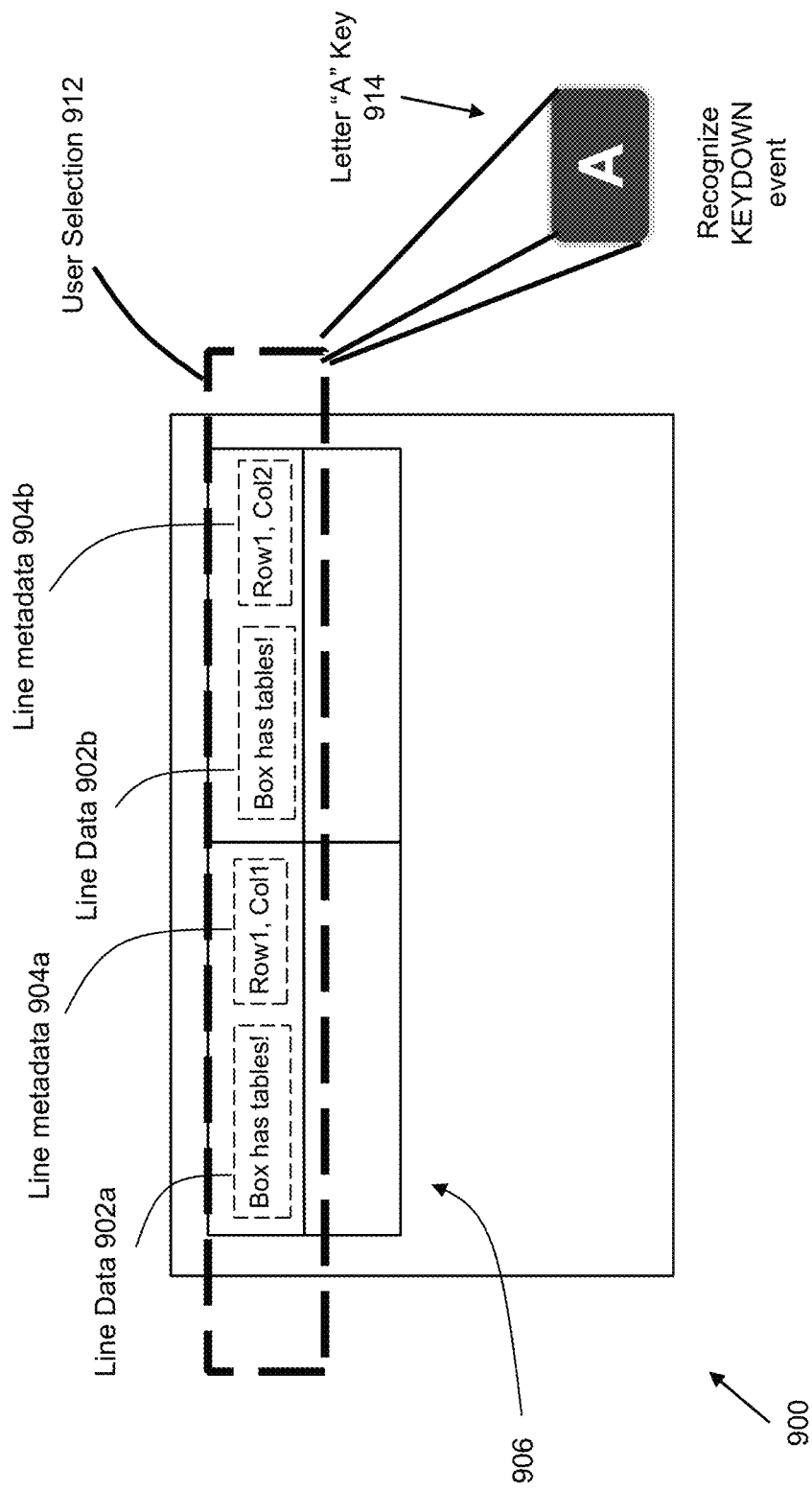

As shown in FIG. 9B, assume that the user has selected this first row. This action may have been taken, for example, by the user manipulating a mouse pointer 910 to create a selection box 912 that encompasses the entirety of the first row in table 906. As shown in FIG. 9C, further assume that the user presses down on the keyboard key 914 for the letter "A".

Figure 9D:
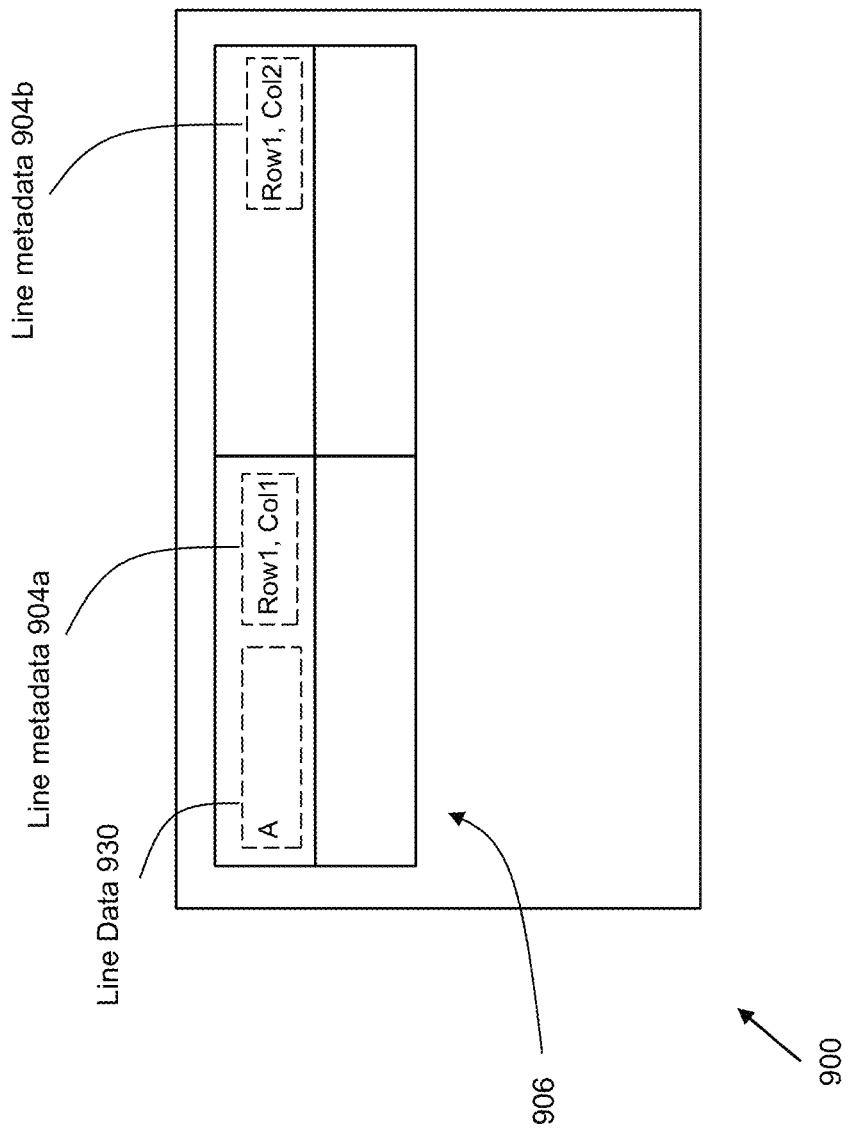

The user intent is to delete the content of the line data 902a and 902b, and to then insert the letter "A" within the first column (e.g. at the current location of line data 902a). This is illustrated in FIG. 9D, where the structure of table 906 still includes two rows having two columns. However, the contents of the first row have been removed, and instead the letter "A" is inserted as new line data 930 in the first column.

However, as shown in FIG. 9E, the default contentEditable functionality in the browser may incorrectly remove the entire row itself, rather than just the content of the row. This would leave the table 906 as having only a single row, with the new line data 930 being inserted entirely outside of the table 906. This occurs, for example, because the default browser action would react to the user selection of line data 902a, line metadata 904a, line data 902b, and line metadata 904b by deleting all of this selected data, including the metadata 904a and 904b. By removing the metadata 904a and 904b, this causes the table to no longer recognize the structure of these row/column objects within table 906.

Figure 9F:
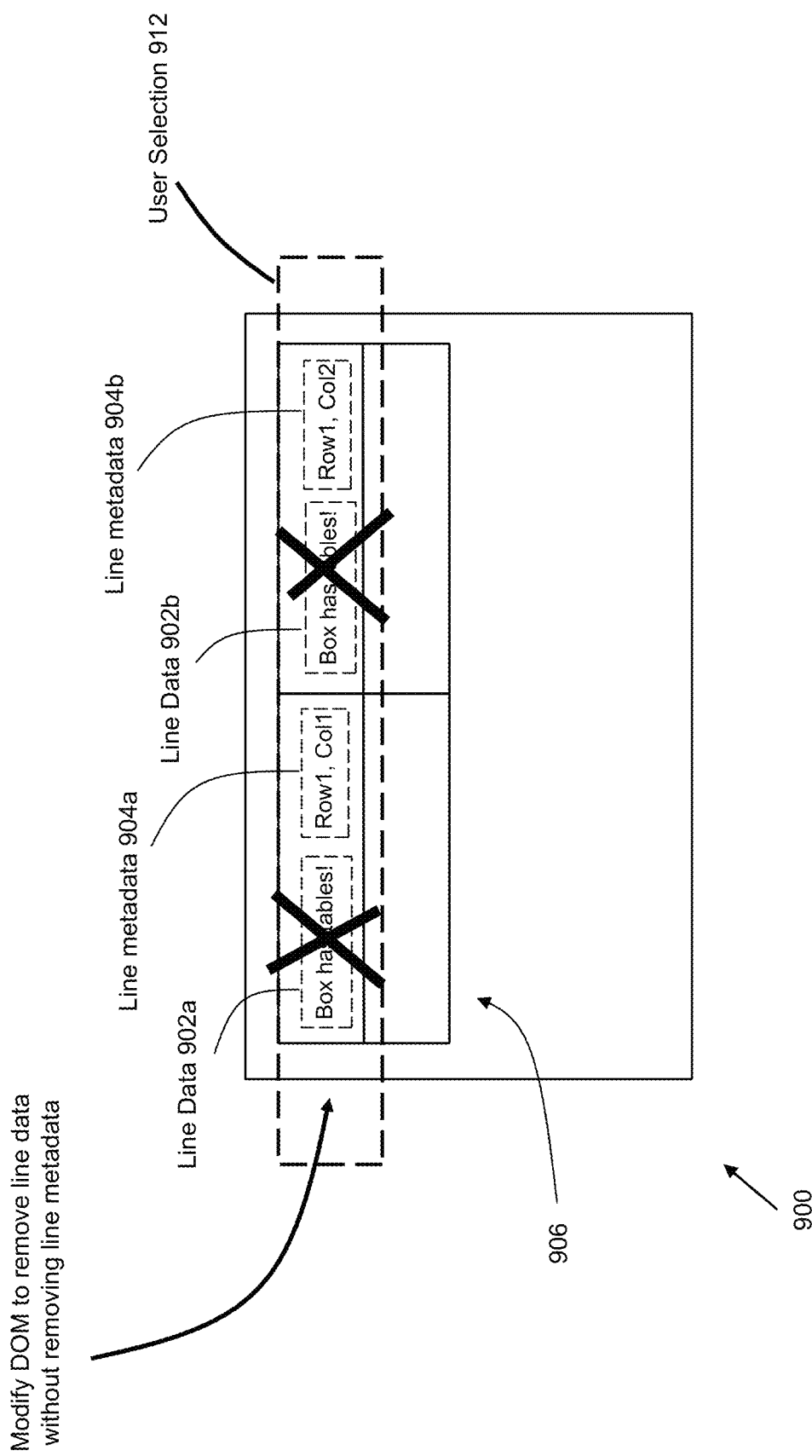

As such, additional actions are taken to intercept the default behavior of the browser. As shown in FIG. 9F, DOM modification is performed to remove the line content 902a and 902b—without removing the line metadata 904a and 904b. In this case, the HTML corresponding to line data 902a and 902b are removed from the DOM, while the HTML that correspond to metadata 904a and 904b are not removed.

Figure 9G:
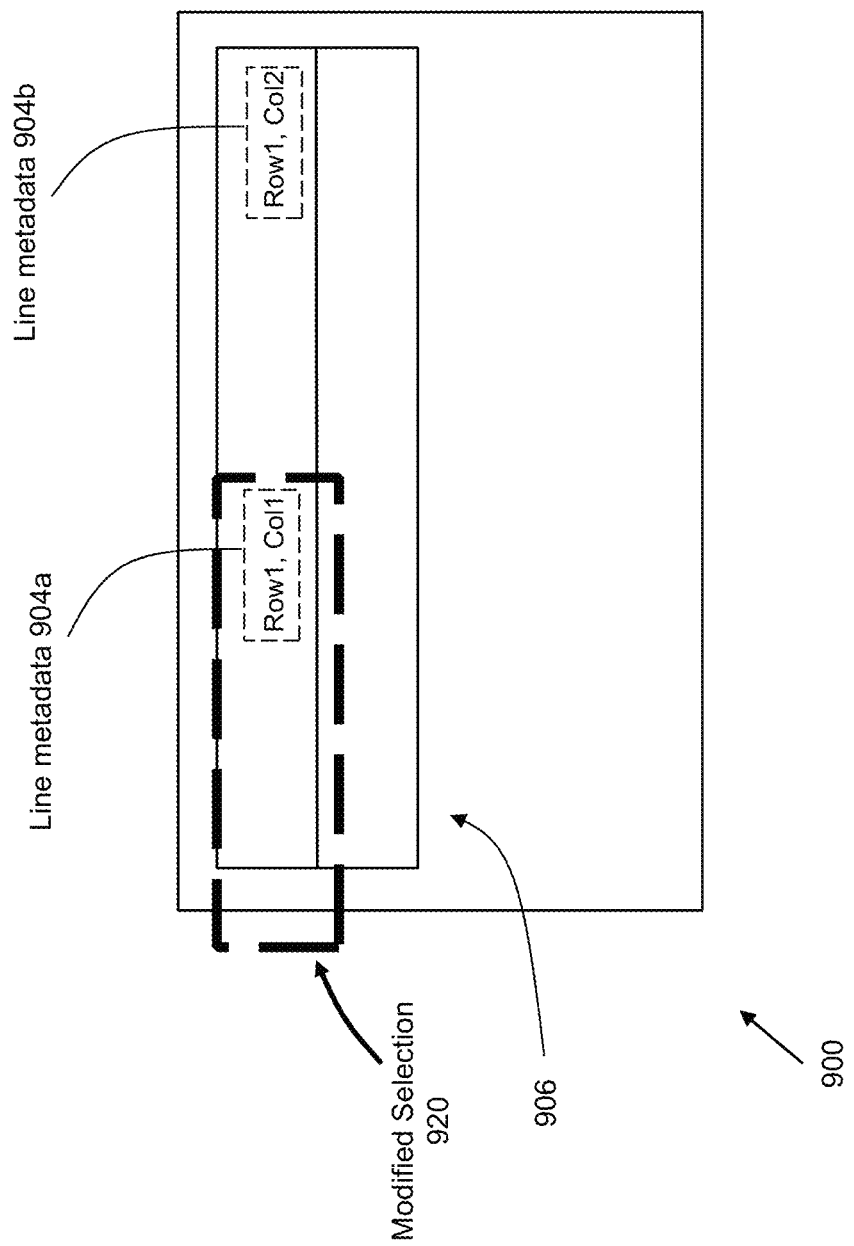

At this point, the user selection is still across multiple cells in the table 906, even though the insertion of the letter "A" is intended to be made only within a single table cell. Therefore, as shown in FIG. 9G, the user selection is modified to become a new modified selection 920 that only includes the intended selection from the user behavior. In this case, if the intended insertion of the letter "A" is only to be made in the first column of the first row, then the modified user selection 920 will only encompass that portion of table 906.

Figure 9H:
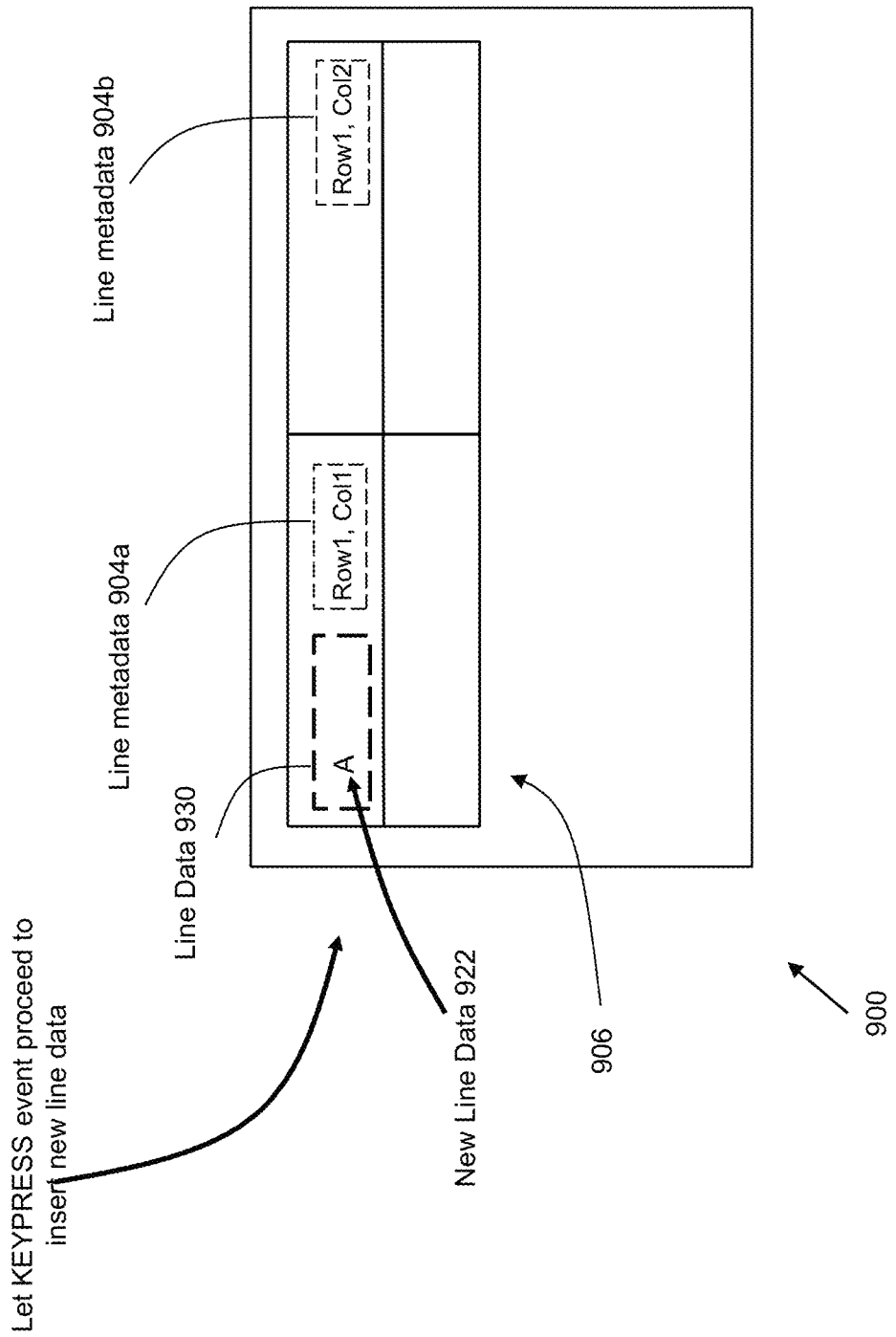

Thereafter, as shown in FIG. 9H, normal contentEditable functionality can then proceed in the browser to insert the new data "A" as line data 930 within the appropriate cell in the table 906, e.g., by processing the keypress event for the letter "A" and then modifying the DOM of page 900 to account for insertion of this letter in the appropriate location in table 906.

This approach therefore permits the expected behavior of the user action to be reflected in the DOM of the page 900. The process is very efficient, since only certain of the default actions need to be intercepted and modified (e.g., for DOM modification and selection modification). The rest of the default contentEditable functionality can proceed as normal without interruption or change. It is noted that depending upon the specific user action that is taken, it is possible that interception for DOM modification is performed without requiring selection modification, and vice versa.

Additionally, this approach provides clean support for Input Method Editors (IMEs), which power non-Latin languages and virtual keyboards. The only change necessary is to hook into the compositionstart event instead of keydown, since IMEs communicate via composition events.

The system can employ efficient approaches for all sorts of table scenarios (as well as for various other features). To follow from the example above, suppose the user chooses to 'Cut' instead of pressing a key. In this situation, it is not desirable to prevent the event; that would prevent the removed content from ever making it into the copy buffer (Clipboard). One could utilize the Clipboard API; however, this approach can be avoided due to its highly browser-dependent implementations. Instead, on cut (and/or keydown), the system can copy the user's selected DOM content to a hidden location, move the selection range to that duplicated content, and remove the content the user thought had been selected (while preserving the table structure). Duplicating the selected content into a hidden container that is also contentEditable will guarantee the content still makes it to the Clipboard, and to the end user, the selected content will appear removed. The only overhead is the introduction and cleanup of a dummy element for the duration of the keydown.

Figure 7:
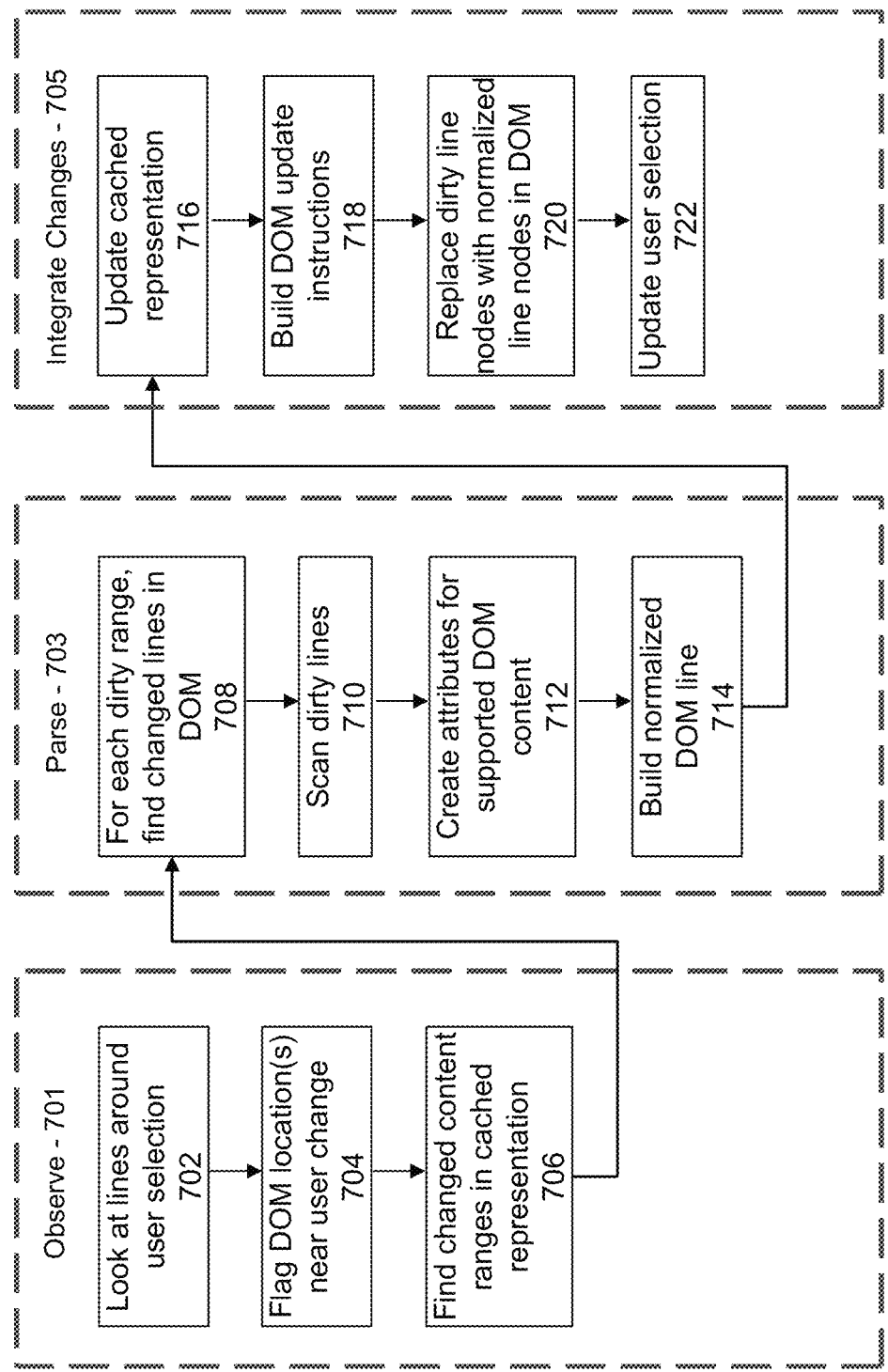
FIG. 7 shows a detailed flowchart of an approach to implement a structure node according to some embodiments of the invention.

FIG. 7 shows a flowchart of a process to implement changes to the data representation(s) of the document being edited by the user, where this figure outlines actions that follow from the end of FIG. 6. The reason for performing this process is because the collaboration system may maintain its representation of the document being edited (possibly in a cache representation and/or non-cache representation), and the results from performing the contentEditable functionality may need to be reflected in the collaboration system's representation of the data.

The first set of actions at 701 is to "observe" for any changes made by the user actions. At 702, a check is made of the lines in the vicinity of the user selection. This can be performed by starting at the cursor location, and traversing up or down to the neighboring lines attempting to find changes made by the user actions. If any changes are identified, then the process may keep going until no further changes are identified.

At 704, the process flags the DOM location(s) near the user change. This action will mark the identified nodes in the DOM as being dirty. The idea is that this action performs an initial "rough" or "high level" identification of any changes that may have occurred based upon the user actions. This is a first pass that will be refined later in the process.

At 706, the changed content is identified within the cached representation of the data that was edited by the user. The cached representation refers to a locally cached copy of data from a collaboration/cloud-based storage system that is being accessed by the user. This action would find the changed content ranges in the cached representation, which would be identified as "dirty ranges".

Once all changes were found from the "observe" actions, the next set of actions at 703 is to parse the changes, to hone in on the specific lines that were changed. At 708, the process proceeds to identify, for each dirty range in the cached representation, the changed lines in the DOM. This step identifies the specific portions of the DOM that contain changes made by the user edits. At 710, the dirty lines are scanned for the exact changes that were made.

At 712, attributes are created for the supported DOM content. The attributes are created in an internal representation language for content that is supported in the DOM. The idea is that an internal representation or model may be created by the collaboration/cloud-based storage system of the data being accessed (e.g., using an operational transform or "OT" language). This operational transform language may use a syntax that is native to and/or efficient for the collaboration/cloud-based storage system. Therefore, the specific set of content for the data and/or changes to be affected by the user edits are initially created in this operational transform language, rather than in the HTML or other language that is understandable by the browser. It is noted that in implementations of the invention that do not use or require such an internal representation, then this step can be skipped.

The next action at 714 is, for each dirty line, to build a normalized DOM line node. This action creates the content in a language such as HTML that is understandable by the browser. The normalization action is to account for possible browser implementation differences by normalizing back to a standardized DOM state after contentEditable has finished its native behavior.

The changes are then integrated at 705. At 716, the cached representation is updated to reflect the new content state. At 718, update instructions are built for the DOM. The update instructions correspond to changes to the DOM that are needed to reflect the updated content. At 720, the dirty line nodes are replaced with the normalized line nodes in the DOM. Thereafter, at 722, the user selection is updated (dirty node loc→normalized node loc). The changes are also synchronized with the server in the cloud/collaboration system.

This portion of the disclosure will now provide a detailed description of illustrative embodiments of the various nodes (e.g., structure nodes and/or line nodes) according to some embodiments of the invention.

As previously noted, the nodes are usable to correct deficiencies in the default way that contentEditable functionality is implemented by conventional browsers. contentEditable is a functionality native to all major browsers that allows users to edit the text contents of an HTML container. The user can freely enter text, move his cursor around, select text, cut, paste, undo, etc. In some editors, nearly all user actions in the editor enter via the contentEditable flow. When a user types, the browser natively captures the text input and converts it to HTML that is immediately inserted into the DOM inside the contentEditable container.

The exact transformation of raw text to HTML can be different between browsers, as this architecture is dependent on the browser's implementation. For example, an enter key may be a single <br> in one browser, and <br><br> in another browser.

An "editor event loop" refers to an interval that runs constantly to check for changes the user has made to the contentEditable editing surface, where each iteration executes all incorporation logic. For example, this interval may run every 200 ms in some embodiments, and a new iteration can be forcibly kicked off if needed. A callstack pertains to a closure containing the entire state of the current event loop. Any code that requires context from the editor can be run in the callstack.

"Incorporation" is performed to determine whether the user has made changes via contentEditable and, if so, to fully captures those changes. This action compares representations against the changed DOM in order to determine if the user has made changes. If changes are found, then the changes are determined, parsed, sent to the server, and the changed line nodes are normalized and rebuilt.

The changed DOM refers to the raw DOM HTML content inside the editor's contentEditable container. As a user types, contentEditable automatically updates this DOM. This is referred to as "changed" since it contains the latest changes which may not have been incorporated yet (and thus are not reflected in line representation). New content in the changed DOM may be regarded as dirty until it has been captured via incorporation.

The line node corresponds to an entire line of content in the editor. In the changed DOM, a line node maps to a single line of content. Therefore, if "enter" is pressed on a line, a new line node is created. Visually, a line node in the changed DOM may look like, for example, "<div id="magicdomidX" data-node-type="line-node" . . . </div>".

The editor is driven by the line as the base "unit". Using the editor event loop, the system constantly monitors these lines to see if their content has changed. All line nodes, after being recognized by the editor, are cached in a line representation. The incorporation process is continually comparing line nodes in the changed DOM to line nodes in the line representation cache to determine if a user has made any changes.

With regards to the data representations, an in-memory state may be maintained by the editor. A snapshot is kept of the editor's contents, as well as the last known selection/cursor position of the user. The representation is updated on every incorporation flow to account for: (a) content the user has modified; and/or (b) the change of the user's cursor position. It is also updated whenever other forces modify the state of the editor, such as for example, direct insertion via an editor feature or a collaborated user modifying the content.

In some embodiments, the data representation may include some or all of: (a) line representation; (b) an array that pertains to data about the internal language representation for each line; (c) the current start selection from the user, e.g., where "[3, 5]" indicates the start of user's selection is on line 3, character 5; and/or (d) the current end selection of the user.

The line representation may include a skiplist that holds a snapshot of all lines in the changed DOM. An index may provide, among other things, a pointer to the unique ID of that line in the changed DOM (ex: "magicdomid4"). On an incorporation, the line representation is compared against the changed DOM in order to determine what content the user has changed. In an idle state (e.g., user is not changing content), the line representation is expected to directly mirror the changed DOM. This means in some embodiments that every line in line representation is a correct line node and that no line nodes exist in the changed DOM that do not also exist in the line representation in the correct location.

A clean line node refers to a line that has no changed content from what the editor already knows it to contain. The clean line node was not modified by the user and already exists as a line representation. A clean line node can be identified by checking its innerHTML in the changed DOM against the knownHTML attribute that is attached to the line node by the editor. If these match, the line node is clean.

A dirty line node is a node that has had its content modified from what the editor knows it to be. The dirty line node has been modified by the user in some way and should be identified, parsed, collected, and rebuilt with normalized DOM.

The dirty line node can be identified by checking its innerHTML in the changed DOM against the knownHTML attribute that is attached to the line node by the editor. If these values do not match, the line is dirty.

The structure node corresponds to metadata that provides structure to line content. The structure nodes can optionally wrap Line Nodes to provide structure to content. For example, table tags can be implemented with (<table><tr><td>) and lists can be implemented with (<ul><li>, <ol><li>). As noted above, users are not able to affect structure nodes directly with contentEditable functionality. Instead, an editor program would capture key events that occur near structure nodes and handles them with direct DOM operations, as described above.

According to some embodiments, a recognized structure node is a node(s) that the editor has sanctioned and acknowledged. A sanctioned structure node can be identified, for example, by having a designated data attribute (e.g., 'data-node-type="structure"' . . . ) and having an in-memory flag on the node instance (e.g., _isStructure=true).

To create the structure node in some embodiments, the structure is injected by building a changeset and directly inserting it. Since the structure is directly injected, the structure node will enter the DOM as already acknowledged. As part of structure node creation, the system can set two identifying markers on the element, including for example, (a) data-node-type="structure" on the element HTML; and (b) _isStructure=true on the in-memory instance that is backing the node.

Line node insertion instructions are used to update the DOM with the normalized line nodes to be inserted. This provides a simple set of anchors and groups of nodes-to-insert that can then be used to update the changed DOM. This also takes into account the specifics of the structure nodes, e.g., by breaking up a flat list of consecutive line nodes to insert into chunks that properly weave in and out of structures.

According to some embodiment, the instruction format for a single instruction has the following format: [nodeToAddAfter, normalizedLineNodesToInsert], where "nodeToAddAfter" is an anchor node. All "normalizedLineNodesToInsert" will be placed directly after "nodeToAddAfter". The "normalizedLineNodesToInsert" object is a list of normalized line nodes to insert. In some embodiments, this is consecutively ordered and will not be reordered. A full list of instructions may contain multiple individual instructions.

With regards to copy/paste activity by the user, if a user pastes in content that has a supported structure in it, the incorporation flow will make a best-effort to roll-in that structure. When incorporation is collecting the content of dirty line nodes, a check will be made whether the node is a type which can possibly be recognized as structure. For example, if the dirty content is a <table> tag, it may be desirable to perform normalization to make it into an acknowledged table. To support and normalize a dirty node into a structure node, this can be performed during incorporation operations, where the node will be persisted during incorporation and the text content is preserved via new line node(s).

With regards to pasting of structure nodes, in some embodiments, pasting a structure node does not duplicate that structure node by default. It is noted that structure nodes may be identified by unique IDs in the DOM, and therefore duplicating those unique IDs would cause potential problems. On creation, a structure node in some embodiments has both an element attribute and an in-memory flag (_isStructure) set. When pasting, the element attribute persists, but the _isStructure flag does not. This flag was set on the instance backing only the original structure node and does not transfer into the copy buffer/pasted content. Thus, by default, a pasted structure node will be removed during incorporation because it is not approved content (e.g., not a line node or structure node).

If a structure node is desired for pasting functionality, then in some embodiments, the individual feature can choose to detect pasted structures during incorporation—especially, content collection. The detection actions may involve checking for the data attribute (e.g., data-node-type="structure") on the pasted HTML. Alternatively, or in addition, one can look at the DOM of the pasted content and choose to transform it into a structure node. If the structure node is detected and it is desirable to perform pasting, then the system goes through the process described herein to creating structure nodes process to ensure the pasted content obtains new unique IDs and an isStructure flag.

For example, consider a <table>, where if the <table> is pasted, with no additional logic running, incorporation would preserve the contents of all cells, but the table structure would be lost. To preserve the structure, the system first detects the <table> via either the <table> tagname and/or the existence of data-node-type="structure". Then, a new set of unique IDs is spawned for the structure (e.g., a new table ID, new row/col IDs, etc.) and the process to create a structure node is performed (to attach the data attribute and _isStructure flag).

With regards to a structure change instruction, some embodiments provide an instruction for moving in and out of structure nodes, e.g., [null, lineNodeToInsert], where null is an instruction to ask the line node to insert a structure it expects to live in and place it there. "lineNodeToInsert" refers to a single line node to insert, where the line will be placed in the structure node which its attribute indicates it wants to live in. The following is an example usage: "[[existingNode1, [newNode1, newNode2] ], [null, newNode3], [newNode3, [newNode4, newNode5]] ]". In this example, existingNode1, newNode1, newNode2 are all in the same structure (say, the editor root), where newNode3 wants to live in a different structure that already exists in the DOM (say, the first cell of an existing table). The newNode4 and newNode5 also wish to live in the same structure as newNode3. In this example, the instruction is used to "step into" the existing structure, and then the additional nodes proceed to insert normally from there.

The portion of the disclosure pertains to object repairs. Objects within a collaborative environment may become damaged due to inconsistent changes/edits provided by different users.

For example, tables in a collaborative environment may become "jagged", when add/delete row & column operations are performed on the client editor by multiple users. If these operations are optimistically performed, a user may see his action succeed before it actually makes it to the server. In this situation, the client can only build cells for what it knows the table to look like.

To explain, suppose the client has a 3×3 table. User A adds a row at the end. The editor builds a change set that says "place 3 new cells at end of table". However, consider if user B, on his client, adds a column to the end at roughly the same time. User A's client will place 3 cells in the new row, even though it should have placed 4, since it does not yet know about user B's action. Likewise, User B's client will place 3 cells in the new column, even though it should have placed 4. Thus, two users that managed to perform table structure operations at roughly the same time can cause this type of "jaggedness".

To address this situation in some embodiments, the repair philosophy is that any column that is found in at least one row will be rebuilt to exist in every single row in the table. Because the approach will iterate every row and look at its columns, this by extension means that the same holds true for rows, where any row that is found in at least one column will be rebuilt to exist in every column.

Figure 8:
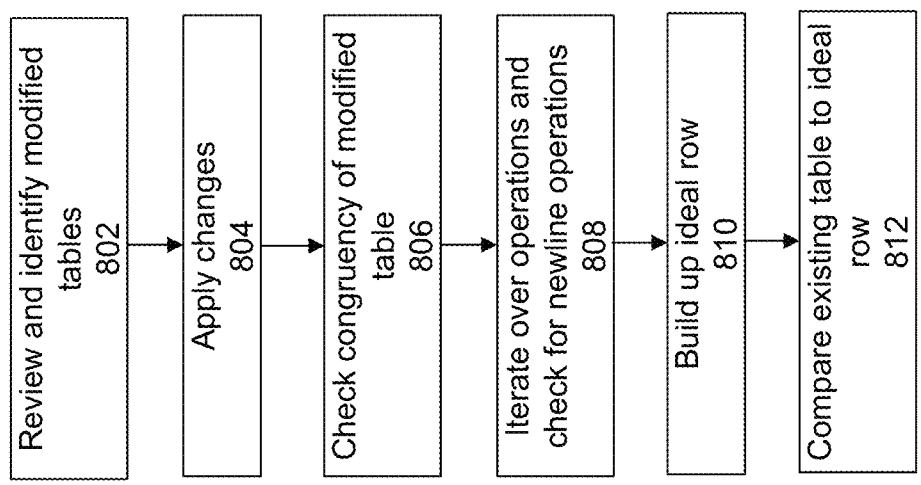
FIG. 8 shows a flowchart of an approach to heal objects that may be damaged or rendered inconsistent due to collaborative editing.

In some embodiments, the system will not delete any rows or columns. Therefore, if a column is found that is not in every row, then that column is restored everywhere (and the cell is not removed). This similarly applies to rows as well. Referring to FIG. 8, some embodiments performs actions at 802 to review and identify modified tables. This action will review a user's incoming changeset. If any table attributes are found, the system will remember which table(s) are modified. At 804, the changes are applied. In some embodiments, the changeset is allowed to be applied as normal. The congruency of the modified table is checked at 806. In synchronous time, if it is known that the user has just modified a table, the system will jump in and check the congruency of the table(s) that was touched.

The process will then, at 808, iterate all operations and look specifically for newline operations that have table structure attributes on them. As the newlines are reviewed, at 810, the system gathers up the existing structure of the table and also what an ideal row looks like in that table. An ideal row indicates what every row in the table should look like. As the system walks each row that exists, it builds up the ideal row to include every column ID that is found anywhere in the table, in the proper order. This can be performed by utilizing a pointer into the ideal row that is reset for every new row that is walked.

As a row is collected, if the column ID at the pointer position matches the column ID found as the system is walking the current row, then this means the situation is acceptable, where the column has already been accounted for and exists in ideal row at the same position. If the column ID at the pointer does not match the column ID at current row, then (a) the system looks for where the current row's current column ID exists in ideal row, and if found, then moves the pointer position (this indicates that the row was missing some columns up to the point where it just moved to); and (b) if the column ID cannot be found anywhere in the ideal row, then this is a column that has not been accounted for yet—the system adds this column ID to the ideal row at the pointer position to place at the correct location.

Next, at 812, the system walks each row in existing table and compare it against ideal row. If the current row is smaller than the ideal row, then the row needs repair (since any column ID that existed even once anywhere in the table made it into ideal row, and it can be determined that a row that matches ideal row's length contains all the correct column IDs already).

To repair a row, the system iterates every column in ideal row and compares that column ID to the column ID at the same position in the current row. If the column IDs do not match, then it is known that the current row is missing that column. Therefore, the system adds to a repair changeset an operation that will add in an empty cell for that column in the current row.

Example Collaborative Environment

Many inventive concepts were described above to implement structured objects in a document, and to allow users to collaborate on those objects. This portion of the document will now provide an example architecture for implementing a collaborative environment to operate upon such objects/documents.

FIG. 1 illustrates an example system 100 having a host server 110 of a cloud based service platform, collaboration workspace and/or cloud storage service with capabilities that enable users and collaborators to simultaneously create, view, edit, annotate, store, share and otherwise manage content in real time or near real time on the cloud-based collaboration platform.

The client devices 102 can be any system and/or device, and/or any combination of devices/systems that is able to establish a communication or a connection, including wired, wireless, cellular connections with another device, a server and/or other systems such as the host server 110. The client devices 102 typically include a display and/or other output functionalities to present information and data exchanged between among the client devices 102 and/or the host server 110.

For example, the client devices 102 can include mobile, handheld or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry® device such as BlackBerry Z10/Q10, an iPhone®, Nexus®, etc.), a Treo®, a handheld tablet (e.g. an iPad®, iPad Mini®, a Galaxy Note®, Galaxy Note II, Xoom Tablet, Microsoft Surface®, Blackberry PlayBook®, Nexus 10® etc.), a phablet (e.g., HTC Droid DNA, etc.), a tablet PC, a thin client, a hand held console, a hand held gaming device or console (e.g., XBOX Live®, Nintendo DS®, Sony PlayStation Portable, etc.), mobile enabled powered watch, (e.g., iOS, Android® or other platform based, Google Glass, a Chromebook™ and/or any other portable, mobile, hand held devices, etc. running on any platform or any operating system (e.g., Mac-based OS (OS X®, iOS, etc.), Windows-based OS (Windows Mobile, Windows®, Windows®, etc.), Android®, Blackberry OS, Embedded Linux platforms, Palm OS, Symbian platform, Google Chrome OS, and the like. In one embodiment, the client devices 102 and host server 110 are coupled via a network 106. In some embodiments and the client devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer, or a combination of the above.

Signals received or detected indicating user activity at client devices 102 through one or more of the above input mechanism, or others, can be used by various users or collaborators (e.g., collaborators 108) for accessing, through the network 106, a web based collaboration environment or online collaboration platform (e.g., hosted by the host server 110). The collaboration environment or platform can have one or more collective settings 105 for an enterprise or an organization where the users belong, and can provide a user interface 104 for the users to access such platform under the settings 105.

In general, the network 106, over which the client devices 102 and the host server 110 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI, FTP, UPnP, iSCSI, NSF, ISDN, PDH, RS-232, SDH, SONET).

The network 106 can be any collection of distinct networks operating wholly or partially in conjunction to provide connectivity to the client devices 102 and the host server 110 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN, a Metropolitan area network (MAN), a Wide area network (WAN, a Wireless wide area network (WWAN, or any broadband network, and further enabled with technologies such as, by way of example, Global System for Mobile Communications (GSM), Personal Communications Service (PCS), Bluetooth, WiFi, Fixed Wireless Data, 2.5G, 3G (e.g., WCDMAUMTS based 3G networks), IMT-Advanced, pre-LTE Advanced, mobile WiMax, WiMax 2, WirelessMANAdvanced networks, enhanced data rates for GSM evolution (EDGE, General packet radio service (GPRS), enhanced GPRS, iBurst, UMTS, HSPDA, HSUPA, HSPA, HSPA, UMTSTDD, 1×RTT, EVDO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
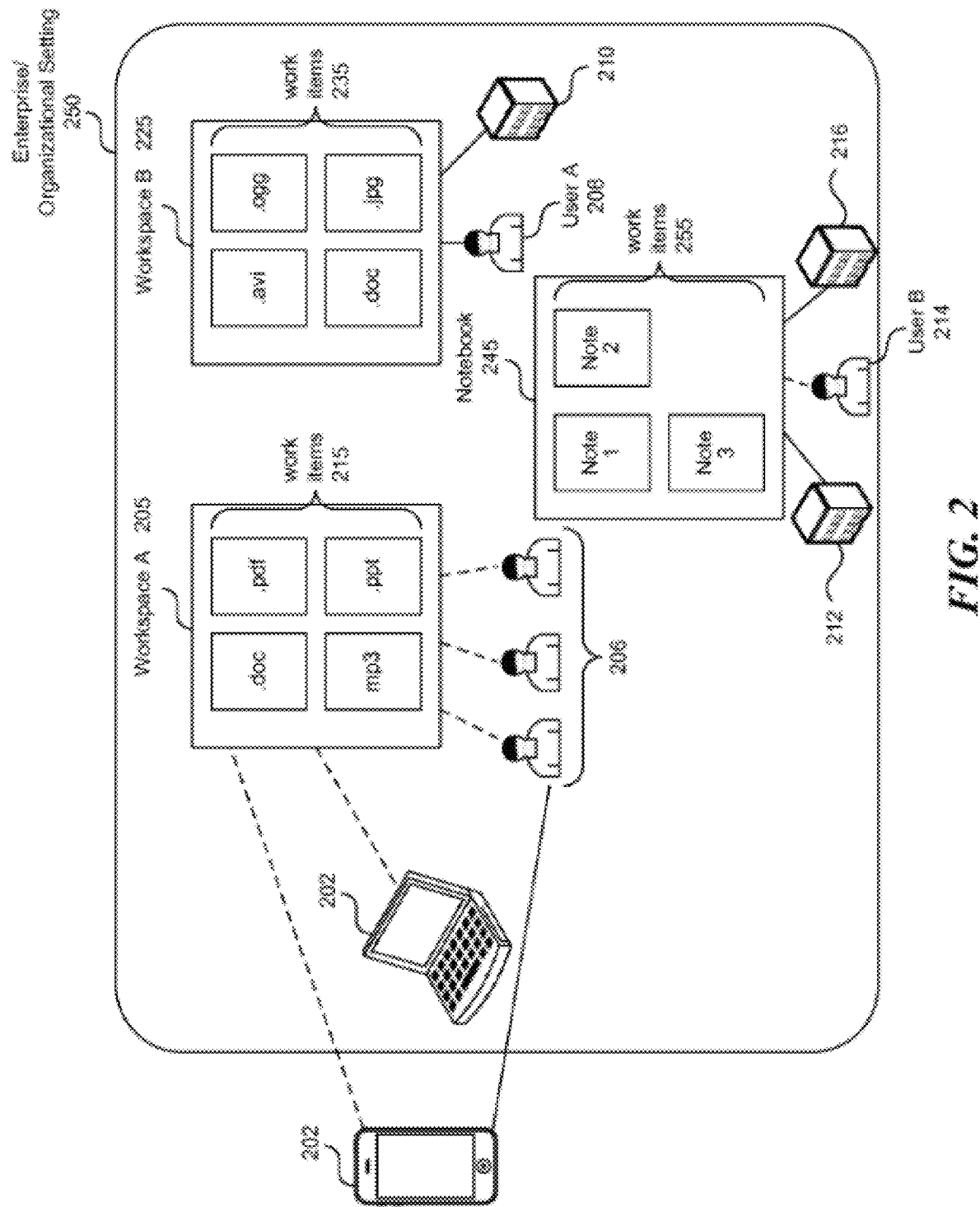
FIG. 2 contains a diagram illustrating an example web-based or online collaboration platform.

FIG. 2 depicts an example web-based or online collaboration platform deployed in an enterprise or other organizational setting 250 for organizing workspaces 205, 225 and 245 and work items 215, 235 and 255.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., client devices 202). For example, the work items 215 and 235 include general digital content, such as pdf files, doc, slides (e.g., PowerPoint® slides), images, audio files, multimedia content, web pages, blogs, etc. On the other hand, the work items 255 comprise "notes" or documents of a proprietary format, which support advanced and unique capabilities of data management and promote collaboration. A workspace can generally refer to any grouping of a set of digital content managed by the collaboration platform. For example, the workspaces A 205 and B 225 include general digital content while the workspace 245, referred to as a notebook, includes notes only. The grouping can be created, identified, or specified by a user or through other means. This user may be a creator user or administrative user, for example.

In general, a workspace can be associated with a set of users or collaborators (e.g., collaborators 108) who have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on work items such that each user can remotely see edits, revisions, comments, or annotations being made to specific work items through their own user devices. For example, a user can upload a document to a workspace for other users to access (e.g., for viewing, editing, commenting, signing off, or otherwise manipulating). The user can login to the online platform and upload the document (or any other type of work item) to an existing workspace or to a new workspace. The document can be shared with existing users or collaborators in a workspace.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a department in an academic institution, a class or course setting, any other types of organizations or organized setting.

When deployed in an organizational setting, multiple Workspaces (e.g., workspace A, B C) can be created to support different projects or a variety of Work flows. Each workspace can have its own associate work items. For example, workspace A 205 can be associated with Work items 215, Workspace B 225 can be associated with work items 235, and workspace 245 can be associated with Work items 255. The work items 215, 235, and 255 can be unique to each Workspace but need not be. For example, a particular work item or a note can be associated with only one workspace or it can be associated with multiple workspaces.

In general, each Workspace has a set of users or collaborators associated with it. For example, workspace A 205 is associated with multiple users or collaborators 206. In some instances, workspaces deployed in an enterprise can be department specific. For example, Workspace B can be associated with department 210 and some users shown as example user A 208, and Workspace N 245 can be associated with departments 212 and 216 and users shown as example user B 214.

In the case of a note in a notebook collaborators of the notebook can have simultaneous read/write access to the note. Specifically, in a concurrent fashion, each of the collaborators is able to make changes to the note or even edit the changes made by other collaborators. In addition, a list of collaborators can be specified at the note level, so that different notes within the same notebook can be associated with different sets of collaborators.

In each workspace A, B . . . N, when an action is performed on a work item by a given user or any other activity is detected in the Workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 and can invite a new collaborator to join the workspace, for example. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Further details regarding an example collaboration environment is disclosed in U.S. application Ser. No. 14/042,473, which is hereby incorporated by reference in its entirety.

Figure 10:
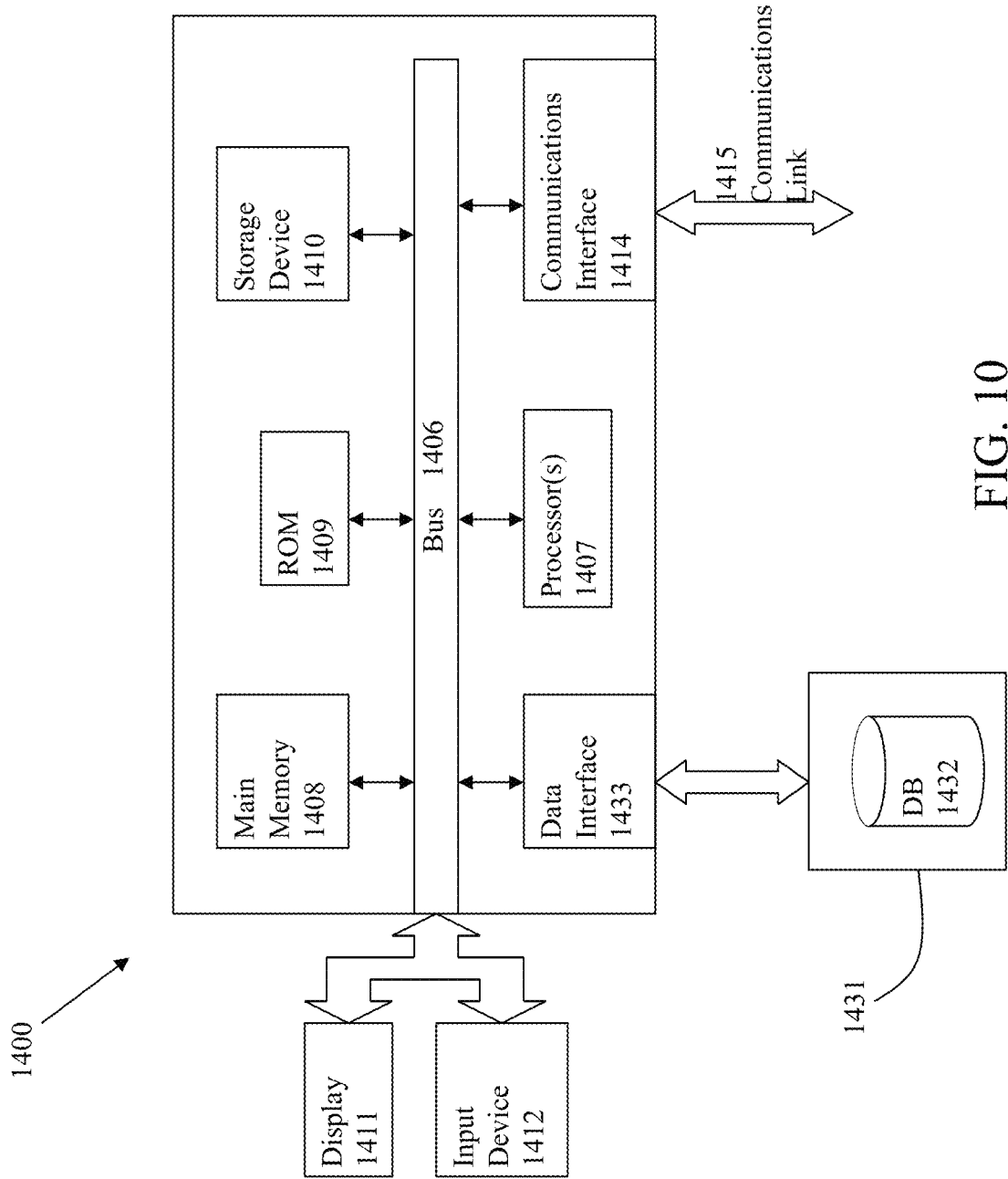
FIG. 10 shows an architecture of an example computing system with which the invention may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method to implement an editing tool, comprising:
   identifying content within an HTML container that correlates to a structured object by identifying specific lines that are associated with parts of the structured object, the specific lines each corresponding to a cell within the structured object;
   determining a portion of content within the HTML container to be edited by a user on a web browser, wherein an editing tool uses a document editing feature of the web browser to edit one or more lines of the HTML container;
   receiving a user selection action of multiple cells of the structured object, wherein the user selection action of the multiple cells causes selection of a portion of the HTML container comprising both contents of the cells and structure of the cells, the content comprising line data and the structure comprising line metadata;
   intercepting the user selection before the document editing feature of the web browser is used to process a user input that would modify both the line data and the structure comprising the line metadata; and
   processing the intercepted user selection by:
      modifying the user selection to generate a modified user selection that includes only content comprising line data and not including structure comprising the line metadata, and wherein modifying the user selection to generate the modified user selection comprises changing the content selected while leaving existing content intact; and
      modifying a document object model (DOM) by removing the HTML content comprising the line data without removing HTML corresponding to the structure corresponding to the line metadata; and
   processing the user input on content selected by the modified user selection using the document editing feature of the web browser and the modified DOM after processing the intercepted user selection to modify the content without modifying the structure.

2. The method of claim 1, further comprising implementing one or more container abstractions corresponding to one or more lines within a HTML container, the one or more container abstractions comprising metadata that identifies a structural context for a line within a structured object, the structural context comprising information corresponding to both a row location and a column location of a cell within a structured object, wherein the metadata associated with the one or more lines within the HTML container is implemented by adding the metadata to the line within the HTML container that is being edited, wherein the content is represented as a line node and the one or more container abstractions are represented as a structure node.

3. The method of claim 2, wherein user editing actions are intercepted to modify the line node without modifying the structure node.

4. The method of claim 2, wherein the one or more container abstractions correspond to one or more cells in a table object.

5. The method of claim 4, wherein the one or more container abstractions that correspond to the one or more cells are stitched together to visually represent a table object in the editing tool.

6. The method of claim 1, wherein the document editing feature of the editing tool uses a contentEditable feature to edit the one or more lines of the HTML container.

7. The method of claim 1, wherein the editing tool is used in a collaborative computing environment.

8. The method of claim 1, wherein keydown analysis is performed to determine whether to intercept a default functionality of the document editing feature.

9. The method of claim 1, wherein the one or more lines of the HTML container are collaboratively operated upon by users.

10. A computer program product embodied on a non-transitory computer usable medium, the non-transitory computer usable medium having stored thereon a sequence of instructions which, when executed by a processor causes the processor to execute a method to implement an editing tool, the method comprising:
  identifying content within an HTML container that correlates to a structured object by identifying specific lines that are associated with parts of the structured object, the specific lines each corresponding to a cell within the structured object;
  determining a portion of content within the HTML container to be edited by a user on a web browser, wherein an editing tool uses a document editing feature of the web browser to edit one or more lines of the HTML container;
  receiving a user selection action of multiple cells of the structured object, wherein the user selection action of the multiple cells causes selection of a portion of the HTML container comprising both contents of the cells and structure of the cells, the content comprising line data and the structure comprising line metadata;
  intercepting the user selection before the document editing feature of the web browser is used to process a user input that would modify both the line data and the structure comprising the line metadata; and
  processing the intercepted user selection by:
    modifying the user selection to generate a modified user selection that includes only content comprising line data and not including structure comprising the line metadata, and wherein modifying the user selection to generate the modified user selection comprises changing the content selected while leaving existing content intact; and
    modifying a document object model (DOM) by removing the HTML content comprising the line data without removing HTML corresponding to the structure corresponding to the line metadata; and
  processing the user input on content selected by the modified user selection using the document editing feature of the web browser and the modified DOM after processing the intercepted user selection to modify the content without modifying the structure.

11. The computer program product of claim 10, further comprising implementing one or more container abstractions corresponding to one or more lines within a HTML container, the one or more container abstractions comprising metadata that identifies a structural context for a line within a structured object, the structural context comprising information corresponding to both a row location and a column location of a cell within a structured object, wherein the metadata associated with the one or more lines within the HTML container is implemented by adding the metadata to the line within the HTML container that is being edited, wherein the content is represented as a line node and the one or more container abstractions are represented as a structure node.

12. The computer program product of claim 11, wherein user editing actions are intercepted to modify the line node without modifying the structure node.

13. The computer program product of claim 12, wherein the one or more container abstractions correspond to one or more cells in a table object.

14. The computer program product of claim 13, wherein the one or more container abstractions that correspond to the one or more cells are stitched together to visually represent a table object in the editing tool.

15. The computer program product of claim 10, wherein the document editing feature of the editing tool uses a contentEditable feature to edit the one or more lines of the HTML container.

16. The computer program product of claim 10, wherein the editing tool is used in a collaborative computing environment.

17. The computer program product of claim 10, wherein keydown analysis is performed to determine whether to intercept a default functionality of the document editing feature.

18. The computer program product of claim 10, wherein the one or more lines of the HTML container are collaboratively operated upon by users.

19. A system to implement an editing tool, comprising:
  a processor;
  a memory for holding programmable code; and
  wherein the programmable code includes instructions for:
    identifying content within an HTML container that correlates to a structured object by identifying specific lines that are associated with parts of the structured object, the specific lines each corresponding to a cell within the structured object;
    determining a portion of content within the HTML container to be edited by a user on a web browser, wherein an editing tool uses a document editing feature of the web browser to edit one or more lines of the HTML container;
    receiving a user selection action of multiple cells of the structured object, wherein the user selection action of the multiple cells causes selection of a portion of the HTML container comprising both contents of the cells and structure of the cells, the content comprising line data and the structure comprising line metadata;
    intercepting the user selection before the document editing feature of the web browser is used to process a user input that would modify both the line data and the structure comprising the line metadata; and
    processing the intercepted user selection by:
      modifying the user selection to generate a modified user selection that includes only content comprising line data and not including structure comprising the line metadata, and wherein modifying the user selection to generate the modified user selection comprises changing the content selected while leaving existing content intact; and
      modifying a document object model (DOM) by removing the HTML content comprising the line data without removing HTML corresponding to the structure corresponding to the line metadata; and
    processing the user input on content selected by the modified user selection using the document editing feature of the web browser and the modified DOM after processing the intercepted user selection to modify the content without modifying the structure.

20. The system of claim 19, further comprising implementing one or more container abstractions corresponding to one or more lines within a HTML container, the one or more container abstractions comprising metadata that identifies a structural context for a line within a structured object, the structural context comprising information corresponding to both a row location and a column location of a cell within a structured object, wherein the metadata associated with the one or more lines within the HTML container is implemented by adding the metadata to the line within the HTML container that is being edited, wherein the content is represented as a line node and the one or more container abstractions are represented as a structure node.

21. The system of claim 20, wherein user editing actions are intercepted to modify the line node without modifying the structure node.

22. The system of claim 20, wherein the one or more container abstractions correspond to one or more cells in a table object.

23. The system of claim 22, wherein the one or more container abstractions that correspond to one or more cells that are stitched together to visually represent a table object in the editing tool.

24. The system of claim 19, wherein the document editing feature of the editing tool uses a contentEditable feature to edit the one or more lines of the HTML container.

25. The system of claim 19, wherein the editing tool is used in a collaborative computing environment.

26. The system of claim 19, wherein keydown analysis is performed to determine whether to intercept a default functionality of the document editing feature.

27. The system of claim 19, wherein the one or more lines of the HTML container are collaboratively operated upon by users.

* * * * *